Aug. 21, 1934.    E. BATCHELDER    1,970,642
ELECTRIC SOLDERING IRON
Filed May 18, 1933
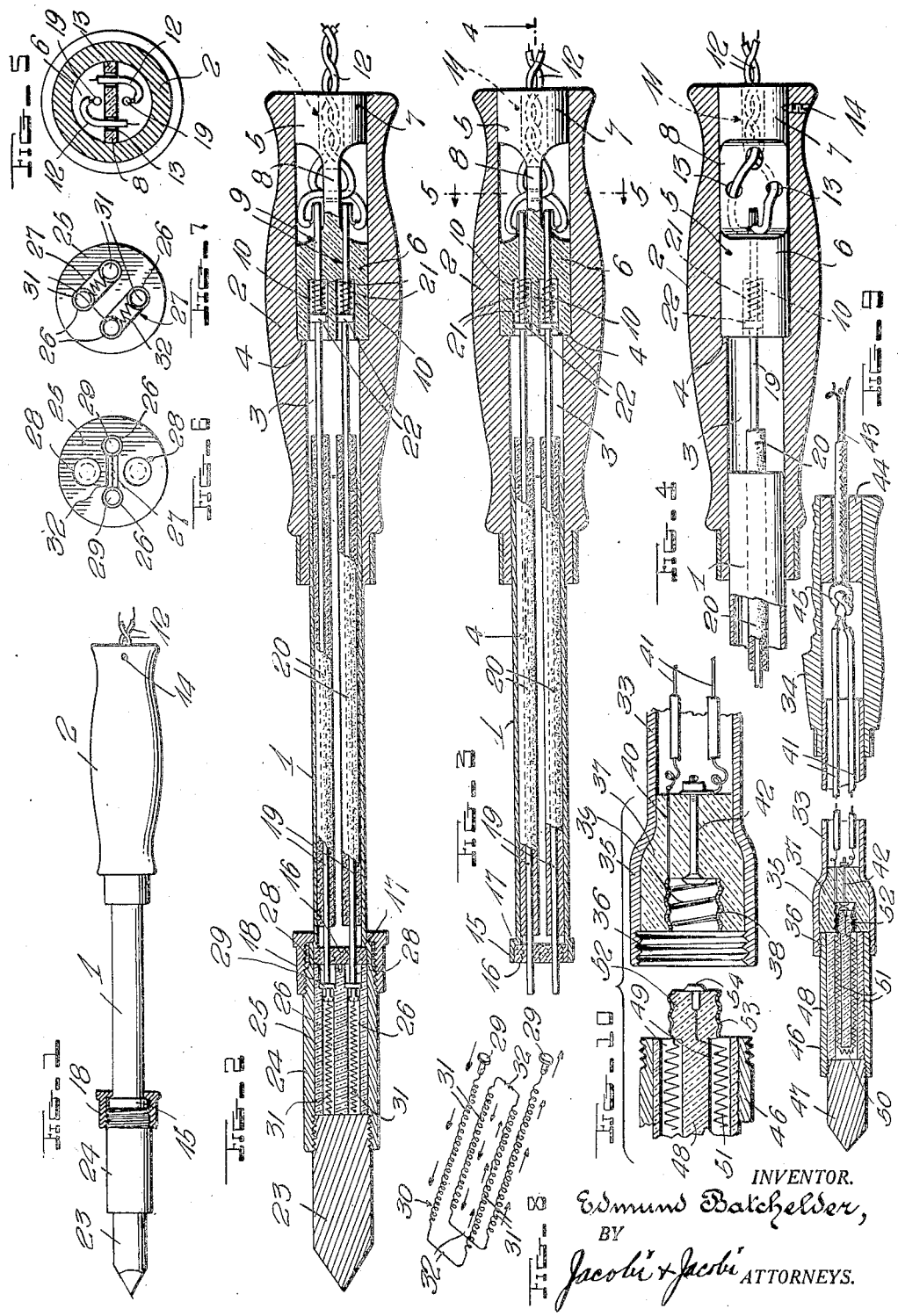
INVENTOR.
Edmund Batchelder,
BY
Jacobi & Jacobi ATTORNEYS.

Patented Aug. 21, 1934

1,970,642

UNITED STATES PATENT OFFICE 1,970,642

ELECTRIC SOLDERING IRON

Edmund Batchelder, Brooklyn, N. Y.

Application May 18, 1933, Serial No. 671,766

12 Claims. (Cl. 219—26)

This invention relates to an electric soldering iron and one object of the invention is to provide a tool of this character having improved means for conducting current through the handle and shank of the tool from power wires entering the rear end of the handle to a heating coil by means of which the soldering head of the iron is raised to a temperature sufficient to melt solder and in addition permit a sleeve extending rearwardly from the soldering head and forming a housing for the heating coil to be disconnected from the shank in order that a cartridge containing the coil may be removed and a new one inserted when a coil in use becomes burned out.

Another object of the invention is to so form this soldering iron that while current may pass easily from the power wire to the heating coil, conductors extending through the shank and handle will be very well insulated and thereby prevent danger of a short circuit and also prevent danger of a person receiving a shock when using the soldering iron.

Another object of the invention is to cause conductors extending through the shank and handle to be urged forwardly so that when their forward ends which project from the front of the shank are engaged by terminals of the heating coil in the cartridge as the sleeve of the soldering head is applied to the shank, these conductors will be forced rearwardly or inwardly against action of their springs and thereby cause a very good contact to take place between the conductors and terminals of the heating coil.

Another object of the invention is to provide the soldering iron with a removable cartridge of such formation that while portions of the heating coil therein will be exposed adjacent the inner or rear end of the soldering head, there will be no danger of the coil making direct contact with the head and causing a short circuit.

A still further object of the invention is to not only permit the cartridge carrying the heat coil to be removed and a new one inserted when necessary but also permit the soldering head to be removed from its rearwardly extending sleeve and thereby allow a new soldering head to be applied when necessary or a larger or smaller head applied for use according to the type of work to be done.

Still another object of the invention resides in providing a device which is simple and durable in construction, inexpensive to manufacture and one which will be very efficient in application to use.

With these and numerous other objects in view, my invention consists in the novel features of construction, combination and arrangement of parts as will be hereinafter referred to and more particularly pointed out in the specification and claims.

In the accompanying drawing forming a part of this application:

Figure 1 is a side elevation of a soldering iron constructed in accordance with this invention, a union forming part of the same being shown in sections;

Figure 2 is a sectional view taken longitudinally through the soldering iron;

Figure 3 is a section taken longitudinally through the shank and handle alone;

Figure 4 is a view taken longitudinally through the handle and rear portion of the shank along the line 4—4 of Figure 3;

Figure 5 is a sectional view taken transversely through the handle along the line 5—5 of Figure 3;

Figure 6 is a view looking at the rear end of the cartridge in which the resistance coil is mounted;

Figure 7 is a front view of the cartridge;

Figure 8 is a perspective view of the resistance or heating coil;

Figure 9 is a longitudinal sectional view through a modified form of soldering iron; and Figure 10 is an enlarged longitudinal sectional view taken through the forward portion of the shank and rear portion of the sleeve and cartridge shown in Figure 9.

The improved soldering iron constituting the subject matter of this invention has a shank 1 formed of metal tube which is rigid in order to provide a strong shank and about the rear end of the shank is engaged a handle 2 of wood or any other desired material having heat resisting qualities. The handle is formed hollow by a longitudinally extending bore 3 having its rear portion of increased diameter to form a shoulder 4 and in this rear portion of the bore is fitted a filler 5 formed of insulating material.

Referring to Figures 2, 3 and 4, it will be seen that the filler 5 has front and rear end portions 6 and 7 joined by a reduced intermediate portion or web 8 and through the front portion 6 are formed longitudinally extending passages 9 disposed at opposite sides of the web 8 and having their forward portions of increased diameter to form pockets 10. A passage 11 is bored centrally through the rear portion 7 to receive the power wires 12 and openings 13 are formed through the web 8 in order that after the power wires have been passed inwardly through the passage 11, they may be threaded through the openings 13 in opposite directions from opposite sides of the web and thereby cause a binding action to take place which will prevent the power wires from being easily drawn rearwardly through the passage 11. It will thus be seen that when the filler 5 is inserted into the handle with its forward end bearing against the shoulder 4 and a set screw 14 shown in Figure 4 is tightened to retain the filler in place, the soldering iron may be used without danger of the power wires being accidentally pulled out of place.

The forward end of the shank is enlarged as shown at 15 to form a cup receiving a plug 16 of insulation constituting a closure for the front end of the shank and the cup also forms a circumferentially extending shoulder 17 for engagement by a union 18 to limit forward movement of this union along the shank. Conductor rods 19 which are insulated as shown at 20 extend longitudinally through the shank and handle with their front and rear portions bared. The forward portion of the conductor rod extends through openings formed in the closure plug 16 and the rear portions of these rods are passed through these passages 9 and project from the front portion 6 of the filler at opposite sides of the web 8 so that inner ends of the power wires 12 may be soldered to rear ends of the conductor rods. Springs 21 are coiled about the conductor rods within the pockets 10 and at their front ends bear against abutments 22 carried by the conductor rods. It will thus be seen that the conductor rods will be urged forwardly and rearward movement of these rods from the position shown in Figure 3 to that shown in Figure 2 will be yieldably resisted.

The soldering head which may be formed of copper or any other desired material has its rear end portion threaded into a sleeve 24 which is preferably formed of brass although any other desired material may be used. This sleeve is of such diameter that its rear end will bear against the wall of the cup 15 and is externally threaded for engagement by the union 18. It will thus be seen that the union may have threaded engagement with the sleeve and when the union is tightened the sleeve will be firmly but removably held in engagement with the shank. The sleeve constitutes a housing for a heater in the form of a removable cartridge. This cartridge 25 is cylindrical in shape and of such dimensions that it will fit snugly in the sleeve with its forward end contracting with the inner or rear end of the soldering head 23 and its rear end bearing against the outer face of the plug 16. The cartridge is formed of insulating material and through the cartridge are formed longitudinally extending passages interconnected at their ends by grooves 27 formed in end faces of the cartridge. Rear ends of certain of the passages 26 are enlarged to form sockets 28 to receive terminals 29 at ends of a heating coil or resistance 30 and referring to Figures 2 and 8, it will be seen that this coil has longitudinally extending portions 31 extending through the passages 26 and connected by bridges 32 seated in the grooves 27. By this arrangement, the coil may be heated by current passing through the same from the conductor rods 19 but there will be no danger of the bridges making contact with the inner or rear end of the soldering head and causing a short circuit. Referring to Figure 2, it will be seen that when the sleeve is disposed against the cup 15 and the union 18 screwed tightly into engagement with the sleeve, the projecting forward end portions of the conductor rod which are received in the socket will prevent the sleeve from turning as the union is tightened and during tightening of the union, contact of the terminals 29 with the front ends of the conductor rod will cause these rods to be moved rearwardly against action of the springs 21. Therefore, the conductor rods will be urged forwardly into close contacting engagement with the terminals 29 and a very good electric connection will be established between the terminals and the conductor rods.

During use of the soldering iron, it is merely necessary to connect a terminal plug carried by the outer ends of the power wire with an outlet socket and as current flows through the conductor rods and heating coil, the coil will be heated red hot and this heat absorbed by the soldering head. A suitable switch at a convenient point in the length of the power wires or any other place desired may be provided for controlling flow of current when the soldering iron is in use. If it is found that the coil has burned out, it is merely necessary to unscrew the union in order to release the sleeve from the shank and the cartridge can then be dropped out of the sleeve and a new one inserted. If the soldering iron is to be used for work requiring a larger or smaller head or a head of a particular shape, it is merely necessary to unscrew the head 23 from the sleeve and apply the new head of the proper size or shape.

In Figures 9 and 10, there has been illustrated a soldering iron of a somewhat different construction. In this embodiment of the invention, the shank 33 which is formed of rigid metal and has a handle 34 at its rear end, has its forward end portions flared to form a cup 35 internally threaded as shown at 36. A filler or plug 37 of insulation fits into the cup 35 to close the front end of the shank and this filler or plug is formed with a socket 38 lined by a metal shell 39. The shell 39 is threaded similar to the shell of an electric light socket and from this shell extends a conductor 40 having its rear end attached to one of a pair of insulated conductors 41 extending longitudinally through the shank and into the hollow handle. The other conductor 41 is attached to the rear end of a pin or bolt extending centrally through the plug into the socket and constituting a center contact. At their rear end, the conductors 41 are soldered or otherwise attached to power wires 43 extending inwardly through a bore formed axially through a bushing 44 in the end of the handle and a knot 45 is provided to limit rearward movement of the power wires through the bushing and prevent strain which would be liable to break the power wires from rear ends of the conductors.

The sleeve 46 extending rearwardly from the soldering head 47 is similar to the sleeve 24 and receives a cartridge 48 formed of insulation. This cartridge is provided with longitudinally extending passages 49 and end grooves 50 through which the heating coil 51 is threaded but instead of providing the cartridge with sockets to receive terminals at ends of the coil, there has been provided a neck 52 which projects from the rear end of the sleeve and carries a collar 53 of conductive material. This collar 53 takes the place of the neck or base of an electric bulb and is intended to be screwed into the liner or shell 39 of the socket 38 when the threaded rear end of the sleeve 46 is screwed into the cup 35. One end of the coil is attached to the collar 53 and the other end of the coil is attached to a center terminal 54 at the rear end of the neck 52. It will thus be seen that when the sleeve and neck of the cartridge are screwed into the cup and sockets 38 the terminal 59 will have engagement with the center terminal 42 and since the collar 53 and liner 39 are in engagement with each other, a circuit will be established through the coil when the current is turned on. When it is necessary to renew the cartridge, it is merely necessary to unscrew the sleeve and cartridge and the cartridge can then be drawn outwardly from the sleeve and a new one inserted.

From the foregoing description of the construction of my improved device, the method of applying the same to use will be readily understood. It will be seen that I have provided a simple, inexpensive and efficient means for carrying out the objects of the invention and while I have particularly described the elements best adapted to perform the functions set forth, it is obvious that various changes in form, proportion and in the minor details of construction may be restored to, without departing from the spirit or sacrificing any of the principles of the invention.

Having thus described the invention what is claimed is:

1. In an electric soldering iron, a shank having conductors projecting from its front end, a head, a sleeve detachably connected with said head and projecting rearwardly therefrom and removably connected with the front end of said shank, a removable filler of insulation fitted into said sleeve through either end thereof, and having sockets in its rear end receiving end portions of said conductors, and a heating coil in said filler having a portion exposed at the front end thereof to heat the head and having end contacts seated in the sockets and engaged by ends of said conductors.

2. In an electric soldering iron, a shank having a handle at its rear end, conductor rods extending longitudinally through said shank, a soldering head having a sleeve extending from its rear end and removably connected with the front end of said shank, a filler of insulation in said sleeve inserted through one end thereof and formed with passages opening through end faces of the filler, certain of the passages receiving front end portions of said rods, and a heating coil passing through the passages and having its ends engaged by ends of the rods, a plug of insulation in the rear portion of said handle slidably receiving said rods, the rods being urged forwardly to establish good conductive contact with ends of said coil, and conductor wires extending into the handle through said plug and attached to the rear ends of said rods.

3. In an electric soldering iron, a shank, a handle at the rear end of said shank, conductor rods extending longitudinally through said shank in insulated relation thereto and urged forwardly with their front ends projecting from the shank, a soldering head, a sleeve extending rearwardly therefrom, a union rotatable about the front end of said shank and threaded upon the rear end of said sleeve to firmly secure the sleeve, a filler of insulation in said sleeve inserted and removable through one end of the sleeve, said filler having longitudinally extending passages interconnected by grooves in ends of the filler and certain of the passages having enlarged rear ends forming sockets receiving the projecting end portions of the conductor rods, and a heating coil threaded through the passages and grooves and having contacts at its ends located in the sockets and engaged by ends of the conductor rods.

4. In an electric soldering iron, a tubular shank, a handle at the rear end of said shank, a closure for the front end of said shank, conductor rods extending longitudinally in the shank and handle and urged forwardly with their front end portions projecting from the closure conductor wires attached to rear ends of said rods, a union rotatable about the front end of said shank, a soldering head, a sleeve connected to the rear end of said head and having its rear end drawn into firm engagement with the shank by said union, a filler of insulation fitted into said sleeve through an end thereof and having its front end contacting with the soldering head, sockets being formed in the rear end of said filler and receiving the extended ends of said rods, and a heating coil in said filler having end contacts in said sockets engaged by front ends of the conductor rods.

5. In an electric soldering iron, a tubular shank, a hollow handle extending rearwardly from said shank, a filler in said handle, power wires extending inwardly through said filler, insulated conductors extending longitudinally through said shank into said handle and attached to inner ends of said wires, the front end of said shank being enlarged to form a cup having its rear end forming a shoulder about the shank, a union about said shank projecting forwardly from said cup, a plug of insulation in the cup closing the shank and formed with openings through which front ends of said conductors project, a soldering head, a sleeve projecting rearwardly from the head and having its rear end in threaded engagement with the union to hold the sleeve firmly against said cup, an elongated block of insulation fitting in said sleeve and formed with longitudinally extending passages connected by grooves in ends of the block, certain of the passages having enlarged rear ends forming sockets receiving the extended front ends of said conductors, and a coil passing through the passages and grooves and having contacts in said sockets engaged by said conductors.

6. In an electric soldering iron, a tubular shank, a hollow handle extending from the rear end of said shank, a filler of insulation in the rear portion of said handle having enlarged front and rear end portions and a web connecting the same, the front end portion of said filler being formed with longitudinally extending passages having their front portions enlarged to form pockets, the rear portion of said filler being bored longitudinally and openings being formed in the web, conductor wires passing through said bore and through said openings, a plug of insulation closing the front end of said shank, insulated conductor rods extending through said shank and having bared front ends projected through said plug and bared rear portions extending through the passages of said filler and attached to the conductor wires, springs in said pockets urging said rods forwardly, a soldering head, a sleeve extending rearwardly therefrom, a union carried by said shank and having threaded engagement with the sleeve to draw the same rearwardly into tight engagement with the shank, and a heating unit in the sleeve having contacts at its rear end engaging front ends of the rods and forcing the rods rearwardly against action of said springs to insure a good electrical engagement between the contacts and rods when the union is tightened.

7. In an electric soldering iron, a tubular shank, a hollow handle engaging the rear end of said shank, a closure block of insulation closing the front end of said shank, insulated conductor rods extending through said shank and having bared end portions extending into said handle and through the block of insulation closing the front of the shank with the front ends of the rods projecting from the closure, a filler of insulation in the handle formed with passages slidably receiving rear portions of said rods and having their forward portions enlarged to form pockets, abutments carried by said rods within said pockets, springs in the pockets engaging said abutments to urge the rods forwardly conductor wires extending inwardly through said filler and attached to rear ends of said rods, a cylindrical casing removably connected with the front end of said shank, a soldering head removably connected with the front end of said casing, and a removable heating unit in said casing consisting of a body of insulation formed with sockets receiving front ends of said rods, and a coil embedded in said body and having terminals in said sockets engaged by the rods.

8. In an electric soldering iron, a tubular shank, a hollow handle at the rear end of said shank, a bored plug in the rear end of said handle, the forward end portion of the shank being enlarged to form a cup having threaded walls, a filler of insulation in the cup and formed with a socket opening through its outer end, a shell in said socket, a center contact extending from said socket rearwardly through said filler, a side contact extending from said shell rearwardly through the filler insulated conductors extending from said contacts through said shank into said handle and attached to conductor wires threaded through the bore of said plug, a soldering head having a rearwardly extending sleeve, a removable cartridge of insulation fitted into said sleeve through its rear end and having a rearwardly projecting neck, a sheath of conductive material about said neck, a center contact in said neck, and a heating coil extending longitudinally in the cartridge with its ends attached to the sheath and center contact, said sleeve being screwed into said cup and the sheathed neck being screwed into said socket with the sleeve and cartridge bearing against the filler and the center contacts of the filler and cartridge engaging each other to establish a circuit through the coil.

9. In an electric soldering iron, a shank, a handle at the rear end of said shank, conductor rods extending through said shank in insulated relation thereto and urged forwardly with their front ends projecting from the shank, a soldering head having a rearwardly extending sleeve, a union releasably connecting the rear end of the sleeve with the front end of said shank, a filler of insulation inserted and removed through one end of the sleeve, and a heating coil extending longitudinally through said filler with its ends engaging front ends of said conductor rods.

10. In an electric soldering iron, a shank, a handle at the rear end of said shank, conductor rods extending longitudinally through said shank, a soldering head having a sleeve extending from its rear end and removably connected with the front end of said shank, a filler of insulation in said sleeve formed with sockets in its rear end to receive front ends of said rods, a heating unit in said filler having terminals exposed in said sockets and engaged by front ends of said rods, a plug of insulation in the rear portion of said handle slidably receiving rear end portions of said rods, the rods being urged forwardly to insure good electric contact of front ends of the rods with terminals of the heating unit, and conductor wires extending into the handle through the rear portion of said plug and attached to rear ends of said rods.

11. In an electric soldering iron, a shank, a handle at the rear end of said shank, conductor rods extending longitudinally through said shank, a soldering head connected with the front end of said shank, a heating element for said head having terminals for engaging front ends of said rods, a filler of insulation in said handle having front and rear portions connected by a reduced neck, the front portion being formed with longitudinally extending passages slidably receiving rear portions of said rods, springs in said passages engaging said rods to urge the rods forwardly and establish good electrical contact between the rods and terminals of the heating unit, and conductor wires passed inwardly through the rear portion of said filler and connected with rear ends of said rods.

12. In an electric soldering iron, a shank, a handle at the rear end of said shank, conductor rods extending longitudinally through said shank, a soldering head connected with the front end of said shank, a heating element for said head having terminals for engaging front ends of said rods, a filler of insulation in said handle having front and rear portions connected by a reduced neck, the front portion being formed with longitudinally extending passages at opposite sides of the neck slidably receiving rear portions of said rods and openings being formed in the neck, springs urging said rods forwardly, and conductors passed through the rear portion of the filler and threaded through the openings of the neck and secured to rear ends of said rods.

EDMUND BATCHELDER.